__United States Patent__ [19]

Andersson

[11] 4,125,737

[45] Nov. 14, 1978

[54] ELECTRIC ARC FURNACE HEARTH CONNECTION

[75] Inventor: Conny Andersson, Viken, Sweden

[73] Assignee: ASEA Aktiebolag, Vesteras, Sweden

[21] Appl. No.: 744,423

[22] Filed: Nov. 23, 1976

Related U.S. Application Data

[63] Continuation-in-part of Ser. No. 634,061, Nov. 21, 1975, abandoned.

[30] Foreign Application Priority Data

Nov. 25, 1974 [SE] Sweden .............................. 7414743

[51] Int. Cl.$^2$ ............................................. H05B 7/00
[52] U.S. Cl. .................................................... 13/9 R
[58] Field of Search ........................................ 13/9, 11

[56] References Cited

U.S. PATENT DOCUMENTS

| 625,252 | 5/1899 | Eldridge et al. | 13/9 |
| 1,254,079 | 1/1918 | Snyder | 13/9 |
| 1,294,837 | 2/1919 | Schlegell et al. | 13/9 |
| 2,789,152 | 4/1957 | Ham et al. | 13/18 |
| 3,997,712 | 12/1976 | Stenkvist | 13/9 R |

Primary Examiner—R. N. Envall, Jr.
Attorney, Agent, or Firm—Kenyon & Kenyon, Reilly, Carr & Chapin

[57] ABSTRACT

A DC electric arc furnace has an electric connector for a melt in the furnace's hearth in the form of an elongated metal conductor having a refractory enclosure exposing an inner end of the conductor for contact with and incidental melting by the melt, the refractory enclosure being formed by a projection of the hearth's lining extending from the inside of the hearth to beyond the hearth's outside with a metal shell enclosing the hearth's projection on the outside of the hearth.

7 Claims, 5 Drawing Figures

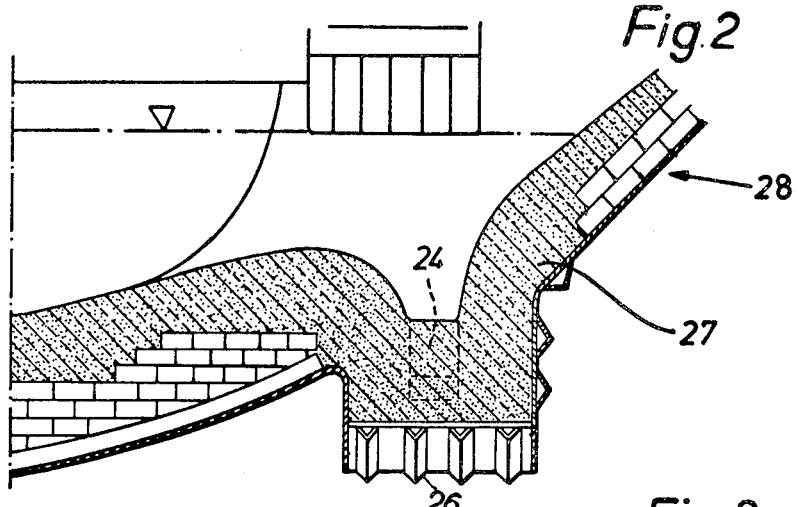
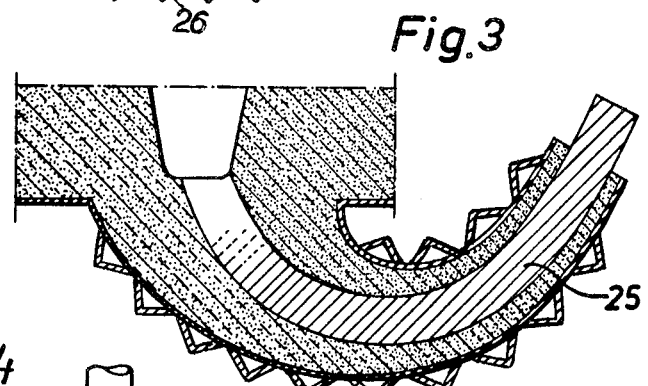
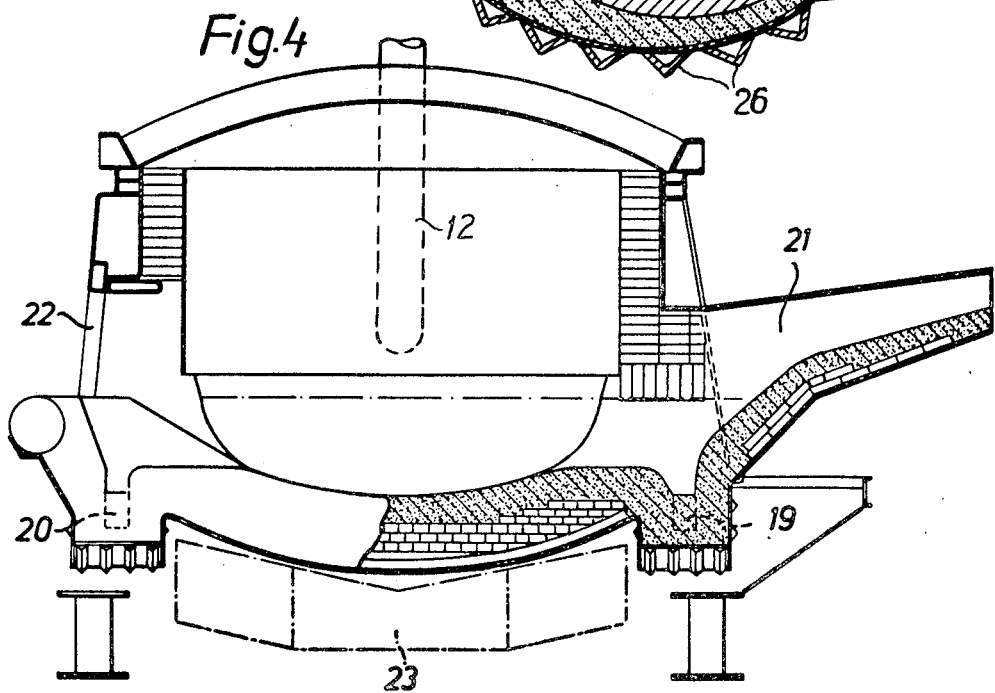

ELECTRIC ARC FURNACE HEARTH CONNECTION

This is a continuation-in-part of application Ser. No. 634,061 filed Nov. 21, 1975. now abandoned.

BACKGROUND OF THE INVENTION

The patent literature discloses DC electric arc furnaces having hearth or melt connectors for conducting current into a melt in a furnace's hearth to power an arc formed between the melt and an arcing electrode, example being the Bowman Pat. No. 3,789,127 and the Valchev et al U.S. Pat. No. 3,835,230. Insofar as is known, there has been no published disclosure of such hearth or melt connectors in any forms capable of being incorporated into DC furnaces which can be commercially made and used.

One practical form is disclosed by the presently allowed Stenkvist patent application Ser. No. 587,714, filed June 17, 1975 now U.S. Pat. No. 3,997,712 issued Dec. 14, 1976, and assigned to the assignee of the present application. There a hearth or melt connector is disclosed in the form of a unit which can be connected to the outside of an electric furnace, the furnace's hearth and the unit having openings through which a melt in the furnace can reach a hearth or melt conductor having a refractory enclosure forming a part of the unit. The construction is practical and can be incorporated into a DC electric arc furnace capable of commerical manufacture and use.

However, it has proven desirable to provide a DC arc furnace construction having a hearth or melt connector capable of commercial manufacture and use and which is simpler, less expensive and at least equally reliable as that disclosed by the Stenkvist application.

For commerical use, both AC and DC electric arc furnaces usually have a physical construction of the Herolt type described in detail by *The Making, Shaping and Treating of Steel*, 7th Edition, published by the U.S. Steel Corporation, reference being had to Chapter 16, 2 of this publication, this reference being hereby incorporated as a part of the present disclosure.

When operated as a DC furnace one or more of the hearth or melt connectors are used, the circuit being via the connector through the melt in the furnace's hearth and via the arc or arcs to the arcing electrode or electrodes.

Briefly stated, such a furnace comprises a steel shell supporting a lining of brick work, the bricks forming the bottom being outwardly stepped upwardly and covered with a layer of sintered granular refractory particles so as to form the hearth for containing the melt. The shell and brick lining forming the side wall are generally of cylindrical contour and extend upwardly to be covered by a roof through which the electrode or electrodes project downwardly to form an arc or arcs with metal charged in the hearth. At one side a tapping spout projects which is also formed by a steel shell, lined with brick work and covered by the sintered granular material so as to form in effect an extension of the hearth, the opposite side of the furnace having a slag opening. The furnace is vertical when operating but can be tilted either towards the tapping spout for tapping or towards the slag opening for deslagging.

As previously indicated, when operated as a DC furnace, a hearth or melt connector is required for forming an electrical connection with the melt in the hearth, the hearth being made of electrically non-conductive refractory materials as indicated, at least in the case of a commercial arc furnace of large capacity.

SUMMARY OF THE INVENTION

According to the present invention, the hearth or melt connector is formed by a hearth projection of the hearth lining, extending from the hearth's inside to beyond its outside. This projection contains the metal conductor in the form of an elongated metal bar or billet having an inner end exposed to the inside of the hearth for contact by the melt and an outer end that extends beyond the hearth projection so as to be available for an electrical connection with a power line. This hearth projection is a part of the hearth itself, being formed of the same granular refractory, and it is held in position by a metal projection shell which encloses the hearth projection on the outside of the hearth and into which the granular material is rammed and sintered. This hearth projection which encases the metal conductor is, in effect, an integral part of the sintered granular refractory forming the furnace's hearth. The projection shell can be made as part of the usual metal furnace shell, so that the entire projection is externally strong.

The usual refractory side wall and bottom lining of the steel shell of an electric arc furnace, is thick enough to provide the thermal insulation required to prevent the steel furnace shell from melting. Therefore, the metal bar encased by the hearth projection of this invention is to some extent cooled by conduction of the heat the connector receives from a melt in the hearth, to the relatively cool outer surface portion of the hearth of furnace bottom lining of which the projection is a part. When working, the inner end of the conductor contacted by the melt, becomes molten, outwardly merging with the solid outer portion which must remain solid to prevent a melt breakout.

The thermal conductivity of the metal conductor or bar or billet, is, of course, much higher than that of the hearth and the hearth projection through which the conductor extends and, therefore, it is not considered advisable to rely solely on thermal conduction from the conductor into the furnace bottom lining and ambient air cooling of the projection, to keep the metal conductor unmelted throughout its outer portion.

Therefore, the metal shell which encases or encloses the hearth projection on the outside of the furnace hearth, is externally provided with water-cooling means. In this way heat can be removed from the outside of the hearth projection on the outside of the furnace bottom or hearth, at a rate positively assuring that the conductor will remain solid throughout its outer portion at all times when working.

In addition to its simplicity, relatively low cost and reliability, this new hearth or melt connection or connector has the great advantage of flexibility as to its location and installation. For example, it can be centrally positioned with respect to the furnace or at any position offset from that position, it can be made as a hearth projection extending from the furnace pouring spout, or it can be positioned offset from the hearth or furnace bottom lining at the furnace's slag opening.

Preferably this new hearth connector with its refractory enclosure is made to extend straight downwardly from the hearth's inside, regardless of the specific location where the connector is positioned. The previously described Stenkvist application discloses a specific example of that connector wherein the unit provides for the metal conductor or billet to be curved so that its inner end can be positioned to contact the melt in the hearth while its outer end is positioned on the outside of the furnace at a level above the melt level in the furnace. This arrangement was used to provide positive insurance against a melt breakout in the event the unit's metal conductor should become molten throughout its entire extent including its outer end. With this new conductor the metal conductor's heat absorbed from the melt is removed not only by the external water cooling of the hearth projection's metal casing, but also by conduction through the hearth refractory of the projection into the outer or lower and cooler portions of the hearth or furnace bottom lining. In this way a redundancy of safety is provided insofar as a melt breakout is concerned, permitting the arrangement to provide for a straight uncurved vertical metal conductor or bar or billet.

The above vertical arrangement has the advantage that carbon-oxide gases which might hypothetically possibly be formed in the molten end of the melt conductor, can escape upwardly through the conductor's molten portion and into the melt in the hearth above so as to become lost in the furnace atmosphere above the melt. It is at least potentially possible that such gases might become entrapped in the molten part of the conductor when it has the previously described curved construction, making it hypothetically possible for an explosion hazard to exist. A fully horizontal conductor presents a more serious risk.

BRIEF DESCRIPTION OF THE DRAWINGS

Various examples of the invention are illustrated by the accompanying drawings, in which:

FIG. 2 in vertical section shows the new connector used at the junction between the hearthproper and its pouring spout;

FIG. 3 shows the curved form of the new connector when it comprises an offset projection of the furnace lining material, as the connector can be used at the location indicated by FIG. 2;

FIG. 4 is a vertical section showing a typical DC electric arc furnace of the type described and indicating the use of a hearth connector such as shown by FIG. 3 at the two previously suggested locations, namely, below the slag opening and in conjunction with the pouring spout as indicated by FIG. 2.

DETAILED DESCRIPTION OF THE INVENTION

Figure 1:
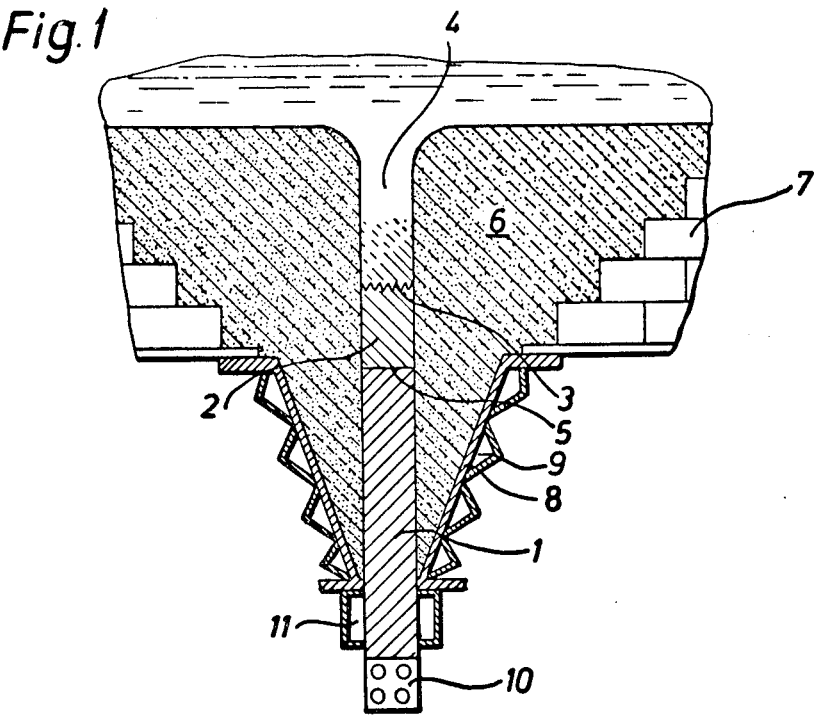
FIG. 1 is a vertical section showing the new connector in its vertical straight form, together with the adjacent portion of the furnace bottom lining or hearth.

In the above drawings, FIG. 1 shows the metal conductor as comprising a copper bar 1 of high electrical and thermal conductivity, to the inner end of which an iron or steel bar 2 of lower electrical and thermal conductivity is integrated as by the use of solder, the innermost end 3 of the steel bar being molten due to the heat of the melt 4. The soldered junction between the copper bar or billet 1 and the steel bar or billet 2 is indicated at 5. An arc furnace melt is steel with which the part 2 is compatible; the part 1 provides for carrying heat from the steel part and conducting current to that part with maximum efficiency.

The usual sintered granular refractory furnace bottom lining 6 above the brick work 7 is shown, this refractory forming the furnace hearth. The hearth projection formed by this granular material is shown as being encased by a steel plate projection shell 8 extending downwardly from the outside of the furnace bottom or hearth and into which the granular material is rammed. This projection shell 8 may be integrated with the usual metal furnace shell.

During the initial construction of the furnace bottom or when replacing the hearth material 6, the composite conductor or billet or bar 1-2 is made long enough to extend upwardly into the furnace so that the granular material 6 can be rammed around the bar and downwardly into the shell projection 8 which can itself be fixed to the metal furnace shell supporting the brick work 7. This brick work 7 is stepped away from the hearth projection location as indicated by FIG. 1. Drying and sintering of the granular material forms both the hearth and the hearth projection into what becomes, in effect, an integral construction. Upon the formation of the melt 4 in the hearth and operation of the arc supplied via the melt and the melt connection with current, the upper ferrous end melts and becomes a part of the melt. The lower portion of the ferrous part and soldered joint 5 and the cuprous part 1 of the connector remain solid providing there is heat removal adequate for this purpose.

For such heat removal, the lower and relatively cool portions of the hearth 6 serve to conduct heat away from the hearth projection. In addition, water coolant is flowed over the outside of the metal furnace shell projection 8, via water passages 9 formed by metal channels, which may be annular as indicated, fixed to the outside of this shell projection. The extreme outer or terminal end 10 of the cuprous portion 1 of the melt or hearth conductor can be directly water-cooled as indicated at 11 via its portion which extends below the bottom end of the shell projection 8.

It is possible to build this new hearth or melt connection into almost any part of the hearth. The hearth and shell projections can be made as ruggedly as is necessary to withstand the service conditions to be expected in the case of a commerical tilting electric DC arc furnace. More than one of the connectors may be used.

FIGS. 2 and 3 provide an example wherein the curved type of hearth projection and shell projection construction is used in a tapping or pouring spout of a furnace. The normal melt level of the furnace extends part-way up the tapping spout and it is visible with this portion of the melt that the connector connects via a passage 24 to which the inner end of the curved electric conductor 25 is exposed, the furnace lining as usual extending up to form the tapping spout lining 27 of the tapping spout 28.

FIG. 4 serves to show the main constructional elements of a typical electric arc furnace which is in this case intended for DC operation. Two melt conductor locations are shown at 19 and 20 for carrying the melt so that the electrode indicated at 12 can form the arc. The tapping spout is indicated at 21. In this case the metal shell portion which extends under the bottom or hearth of the furnace is formed of non-magnetic metal plate to permit an inductive stirrer, indicated at 23, to be used. The two offset locations 19 and 20 indicated by FIG. 4 permit this inductive stirrer 23 to be positioned in the usual fashion while the two connectors at 19 and 20 can be positioned diametrically opposite to each other and symmetrically with respect to the electrode 12 so that the arc deflection can be inherently vertical.

In FIGS. 2 and 3 the water-cooling arrangements are shown at 26 which may be along the lines previously described.

Figure 5:
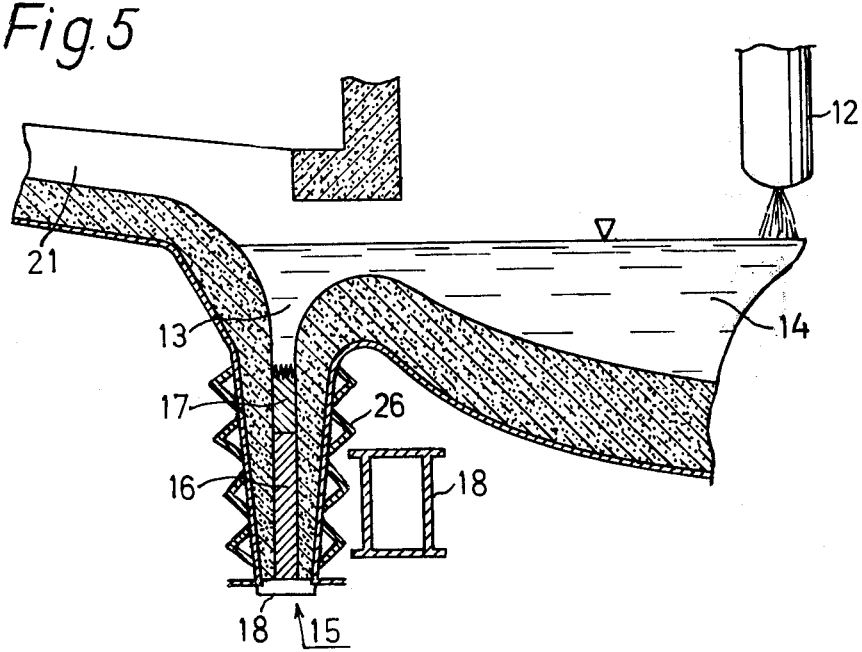
FIG. 5 shows the preferred form of this invention initially shown by FIG. 1 but indicating how this preferred form can also be used where the hearth extends to form the furnace's pouring spout.

As previously indicated, the straight vertical construction of FIG. 1 is considered to be preferable. FIG. 5 serves to show how this same vertical construction can be used at the junction between the hearth refractory that extends to form the bottom of the usual tapping spout.

More particularly referring to FIG. 5, the portion 13 of the melt 14 heated by the arcing electrode 12 and which extends partially up into the pouring spout 21, is shown as contacting the ferrous portion 17 of the composite billet or electrical conductor, with the cuprous part 16 extending downwardly, the entire construction being straight and vertical. The water-cooling arrangement is indicated at 26. The terminal end is shown at 18 to which the power line, suggested by the arrow 15, connects, the bottom end of this terminal part 18 looking somewhat as shown by the offset view in FIG. 5.

The composite conductor bar featured hereinabove is considered to be preferable but the entire electric conductor portion of the new construction may be made of ferrous metal throughout. Because of the simplicity of the new construction and its reliable safety, it becomes possible to use a melt or hearth connector at practically any location desired and using any number of connections desired.

In effect, this new hearth or melt connector or electrode or contactor, essentially comprises the usual metal furnace shell being formed with an opening to which a metal shell projection is fixed such as by the use of welding, the shell projection having its outside provided with any suitably strong and rugged water-cooling channel arrangement for flowing water coolant over the outside of the projection. The usual brick work of the furnace bottom is stepped back to form an opening of slightly greater diameter than the opening formed in the furnace shell and from which the shell projection extends.

Before making up the hearth, the conductor bar or billet is installed in the shell projection with an outer end projecting below the latter and inner end extending at least up to and preferably a bit above the design level of the granular refractory which is to make up the hearth. Then this granular material in the usual way is positioned on the brick work and at the hearth connection is rammed into the metal shell projection. With drying and sintering of the granular hearth refractory, the hearth itself acquires an integral projection in which the metal conductor bar is embedded. Externally the shell projection which may be formed from the same metal plate as is the usual furnace shell, becomes in effect an integral part of the furnace shell, resistant to the service conditions to be expected. The external water cooling is preferably a part of the shell projection. Normally the shell projection and its water coolant channels will be formed from adequately thick metal plate parts welded together and to the furnace shell proper, although it is conceivable that a casting may be used.

When a melt is formed in the hearth and the furnace is in working condition, the inner end of the metal bar of billet conductor melts, to leave a hole in the hearth containing the molten metal with the molten end of the conductor becoming, in effect, a part of the melt. Preferably the shell projection is made conical so as to taper outwardly in the direction of the outer end of the metal connector bar, because this gets the water cooling closer and closer to that end while providing a wedging action for the refractory when being rammed into the projection shell.

As indicated by FIGS. 1 and 5 in particular, the ferrous portion of the metal bar or billet is only partially melted to leave a lower portion from which heat is rapidly abstracted by the cuprous lower portion of the conductor billet from which the heat is removed by the water coolant. Heat is also removed from the conductor via the hearth itself with which the hearth projection integrally joins, at least throughout the lower portion of the hearth material which is adjacent to the usual metal furnace shell.

It can be seen that the simplicity and safety of this new hearth or melt connection permits it to be installed almost anywhere that the inner end of the metallic connector can be exposed to the melt in the furnace's hearth.

What is claimed is:

1. An electric arc furnace comprising a hearth having an inside and outside for containing a melt on its inside, an electrode positioned to form an arc between the electrode and a melt in the hearth when the electrode and melt have connections with an electric power source, an electric melt connection comprising at least one elongated metal conductor having inner and outer ends and a refractory enclosure exposing the inner end for contact with and melting by a melt in said hearth, and cooling means for cooling the conductor at least between its inner and outer ends for removing heat therefrom at a rate preventing the conductor from melting throughout its length to its outer end, said hearth comprising a refractory lining and said refractory enclosure comprising a downward hearth projection of said lining, said projection being an integral part of said lining and extending straight downwardly from the hearth's inside to beyond its outside and to the outer end of said conductor, and a metal shell projection enclosing said hearth projection on the outside of said hearth, said cooling means comprising means for removing heat from at least a portion of said shell on the outside of the hearth.

2. The furnace of claim 1 in which said metal conductor and said refractory enclosure extend vertically downwardly from the hearth's said inside.

3. The furnace of claim 1 in which the metal conductor's said inner end is made of ferrous metal and the conductor's said outer end is made of cuprous metal and substantially integrally connected to said inner end.

4. The furnace of claim 1 in which a metal furnace shell supports the hearth's said outside and said metal projection shell is connected to said furnace shell.

5. The furnace of claim 1 in which said cooling means comprises means for flowing a fluid coolant over the outside of said metal projection shell.

6. The furnace of claim 1 in which said hearth projection and said metal shell projection taper away from the hearth's said outside.

7. The furnace of claim 2 in which said hearth has a tapping spout extending therefrom and said metal conductor and said refractory enclosure extend from the junction of said hearth and spout.

* * * * *